Patented Sept. 23, 1947

2,427,704

UNITED STATES PATENT OFFICE 2,427,704

PROCESS FOR THE PRODUCTION OF BUTADIENE

Joseph E. Bludworth and Max O. Robeson, Corpus Christi, Tex., assignors to Celanese Corporation of America, a corporation of Delaware No Drawing. Application March 20, 1945, Serial No. 583,843

4 Claims. (Cl. 260—681)

This invention relates to the production of butadiene and relates more particularly to the production of butadiene by the vapor phase catalytic dehydration of tetramethylene oxide.

An object of this invention is to provide an efficient and economical process for the production of butadiene by the direct vapor phase catalytic dehydration of tetramethylene oxide.

Other objects of this invention will appear from the following detailed description.

In the preparation of butadiene by the usual processes involving the vapor phase catalytic dehydration of 1,3-butylene glycol at elevated temperatures, a substantial amount of polymerized material is obtained. The formation of such polymers is undesirable since they tend to reduce to a substantial degree the yield of butadiene.

We have now found that butadiene may be obtained in high yield and with a minimum formation of polymerized material by the catalytic vapor phase dehydration of tetramethylene oxide at an elevated temperature.

In accordance with the novel process of our invention, one part of tetramethylene oxide is mixed with from about 0.1 to about 9 parts by weight of water, which acts as an inert diluent, the mixture obtained is vaporized in a preheater and the resulting vapors then passed into a heated reaction zone containing a suitable dehydration catalyst. The action of the catalyst at elevated temperature effects the dehydration of the tetramethylene oxide with the removal of a molecule of water therefrom and this results in the formation of the desired unsaturated hydrocarbon, butadiene. The hot gases issuing from the heated reaction zone are condensed separately by passing them through a series of condensers, each operating at a different temperature. Any unreacted tetramethylene oxide recovered may be recycled in the process.

The temperature in the heated reaction zone may be any suitable dehydrating temperature as, for example, temperatures of from 200 to 800° F. Optimum results are achieved, however, with the reaction zone maintained at a temperature of 450 to 485° F. Temperatures much above 500° F. are undesirable since such temperatures favor the polymerization of butadiene. The preheater in which the tetramethylene oxide is preheated and vaporized is preferably maintained at temperatures of 200 to 800° F., say 450 to 480° F. so that the vapors are at a temperature where they may readily be dehydrated without requiring any excessive quantity of heat to be supplied in the reaction zone to bring the vapors up to the desired dehydration temperature.

The pressure under which the dehydration reaction is effected is preferably atmospheric pressure. Reduced or subatmospheric pressures are also suitable. Pressures above atmospheric pressure, say pressures of 15 to 200 pounds per square inch may also be employed but the pressures should not be so high as to cause condensation of the tetramethylene oxide vapors at the dehydration temperature employed.

Any suitable dehydration catalyst may be employed to effect the vapor phase dehydration of the tetramethylene oxide to butadiene. Examples of suitable dehydration catalysts are primary and secondary calcium phosphates, the phosphates of other alkaline earth metals, nickel phosphate, copper phosphate, lead phosphate, di-ammonium phosphate, mercury phosphate, potassium aluminum phosphate, and aluminum oxide. Preferably, we employ a dehydration catalyst comprising a mixture of alkali and alkaline earth metal phosphates and phosphoric acid. The catalysts may be placed on suitable inert carriers such as pumice, graphite and the like.

In order to illustrate our invention, but without being limited thereto, the following example is given:

*Example*

A liquid mixture comprising 80 parts by weight of tetramethylene oxide and 20 parts by weight of water are introduced at a rate of 30 parts by weight per hour into a preheater heated to 460° F. where the mixture is vaporized. The preheated vapors are introduced into a stainless steel tube containing the desired dehydration catalyst, the preparation of which is described below, which tube is heated so that the temperature of the catalyst and vapors is maintained at about 464° F. The catalyst chamber is of such size that the space velocity of the vapors therein is 0.15 feet per second and the time of contact with the catalyst is of the order of 10.8 seconds. The gaseous reaction mixture obtained after the dehydration is effected, is passed through a trap, a water-cooled condenser, and an ice trap to condense the unreacted tetramethylene oxide and then a dry ice-actone trap to condense the butadiene. The amount of tetramethylene oxide converted to butadiene in a single pass is 23.8%. When maintaining the preheater at 480° F. and the catalyst chamber at 482° F. employing like conditions of space velocity and contact time, the conversion of tetramethylene oxide to butadiene per pass rises to 31.4%.

The dehydration catalyst employed above may be prepared by making a paste with water of the following:

| | Parts by weight |
|---|---|
| Mono-calcium phosphate | 125 |
| Mono-sodium phosphate | 100 |
| Butylamine phosphate | 15 |
| Phosphoric acid (85%) | 15 |

The paste formed is dried and then baked at 500 to 600° F. for 2 to 10 hours. The solid cake obtained is broken up to the desired particle size and the reaction tube may be charged therewith. The catalyst is preferably employed in a particle size of about ¼ inch in diameter.

It is to be understood that the foregoing detailed description is given merely by way of illustration and that many variations may be made therein without departing from the spirit of our invention.

Having described our invention what we desire to secure by Letters Patent is:

1. Process for the production of butadiene comprising forming a mixture of tetramethylene oxide and water, preheating the mixture to at least a vaporizing temperature, and subjecting the vapors at a temperature of 450 to 485° F. to the action of a dehydrating catalyst to effect the dehydration of the tetramethylene oxide to butadiene, said dehydration catalyst comprising a mixture of mono-calcium phosphate, mono-sodium phosphate, butylamine phosphate and phosphoric acid.

2. Process for the production of butadiene comprising forming a mixture of tetramethylene oxide and 0.1 to 9 parts by weight of water, preheating the mixture to at least a vaporizing temperature, and subjecting the vapors at a temperature of 450 to 485° F. to the action of a dehydrating catalyst to effect the dehydration of the tetramethylene oxide to butadiene, said dehydration catalyst comprising a mixture of mono-calcium phosphate, mono-sodium phosphate, butylamine phosphate and phosphoric acid.

3. Process for the production of butadiene comprising forming a mixture of tetramethylene oxide and water, preheating the mixture to at least a vaporizing temperature, and subjecting the vapors at a temperature of 450 to 485° F. to the action of a dehydrating catalyst to effect the dehydration of the tetramethylene oxide to butadiene, said dehydration catalyst comprising a mixture of 125 parts of mono-calcium phosphate, 100 parts of mono-sodium phosphate, 15 parts of butylamine phosphate and 15 parts of phosphoric acid, all parts being by weight.

4. Process for the production of butadiene comprising forming a mixture of tetramethylene oxide and 0.1 to 9 parts by weight of water, preheating the mixture to at least a vaporizing temperature, and subjecting the vapors at a temperature of 450 to 485° F. to the action of a dehydrating catalyst to effect the dehydration of the tetramethylene oxide to butadiene, said dehydration catalyst comprising a mixture of 125 parts of mono-calcium phosphate, 100 parts of mono-sodium phosphate, 15 parts of butylamine phosphate and 15 parts of phosphoric acid, all parts being by weight.

JOSEPH E. BLUDWORTH.
MAX O. ROBESON.

REFERENCES CITED

The following references are of record in the file of this patent:

UNITED STATES PATENTS

| Number | Name | Date |
|---|---|---|
| 2,241,792 | Reppe et al. | May 13, 1941 |
| 1,841,055 | Reppe | Jan. 12, 1932 |